May 9, 1950     C. C. CALKINS     2,506,577
ROTARY ROD WEEDER
Filed March 18, 1946     2 Sheets-Sheet 1
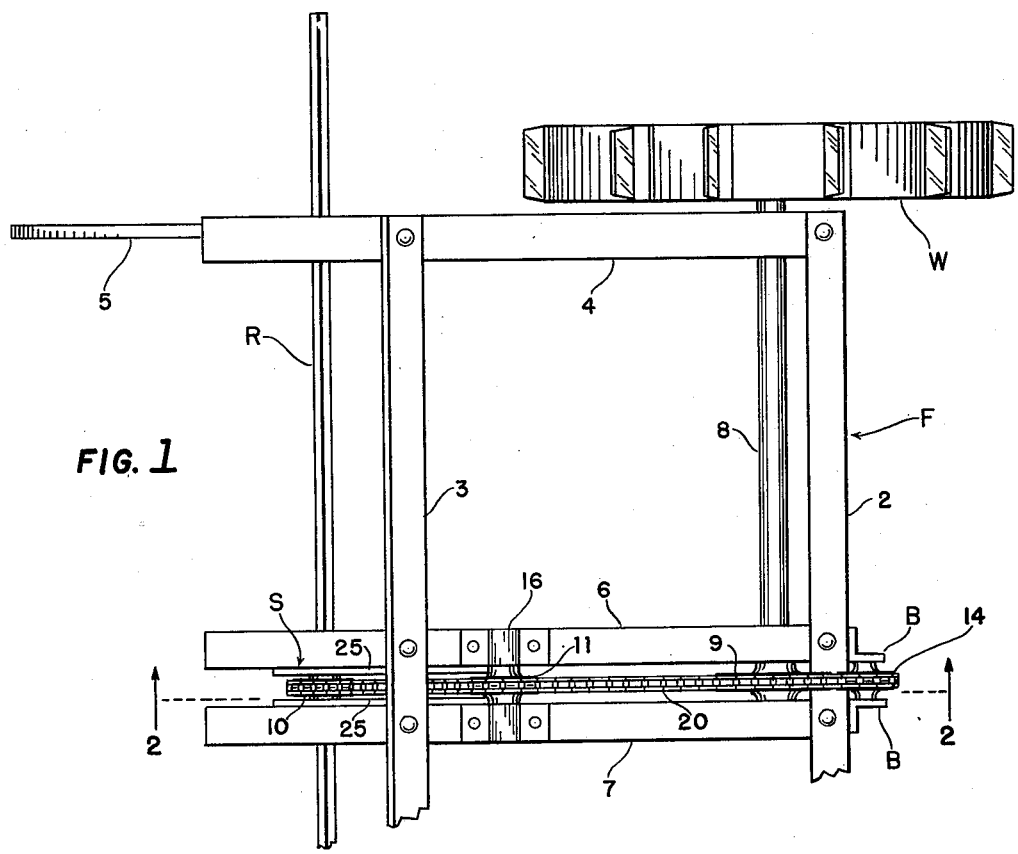
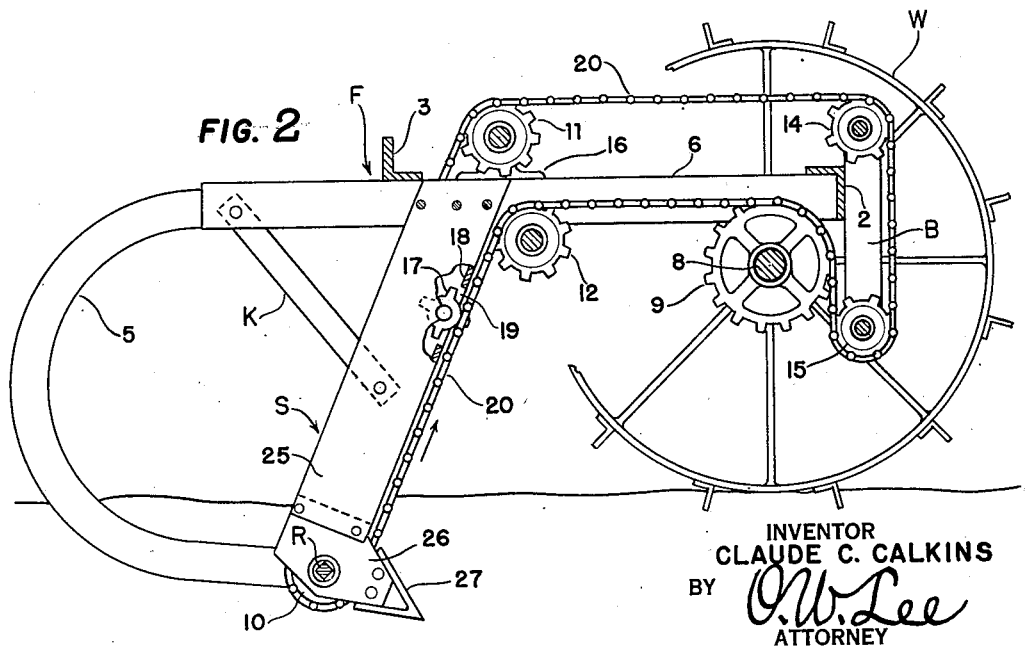
INVENTOR
CLAUDE C. CALKINS
BY O. W. Lee
ATTORNEY May 9, 1950 C. C. CALKINS 2,506,577
ROTARY ROD WEEDER
Filed March 18, 1946 2 Sheets-Sheet 2
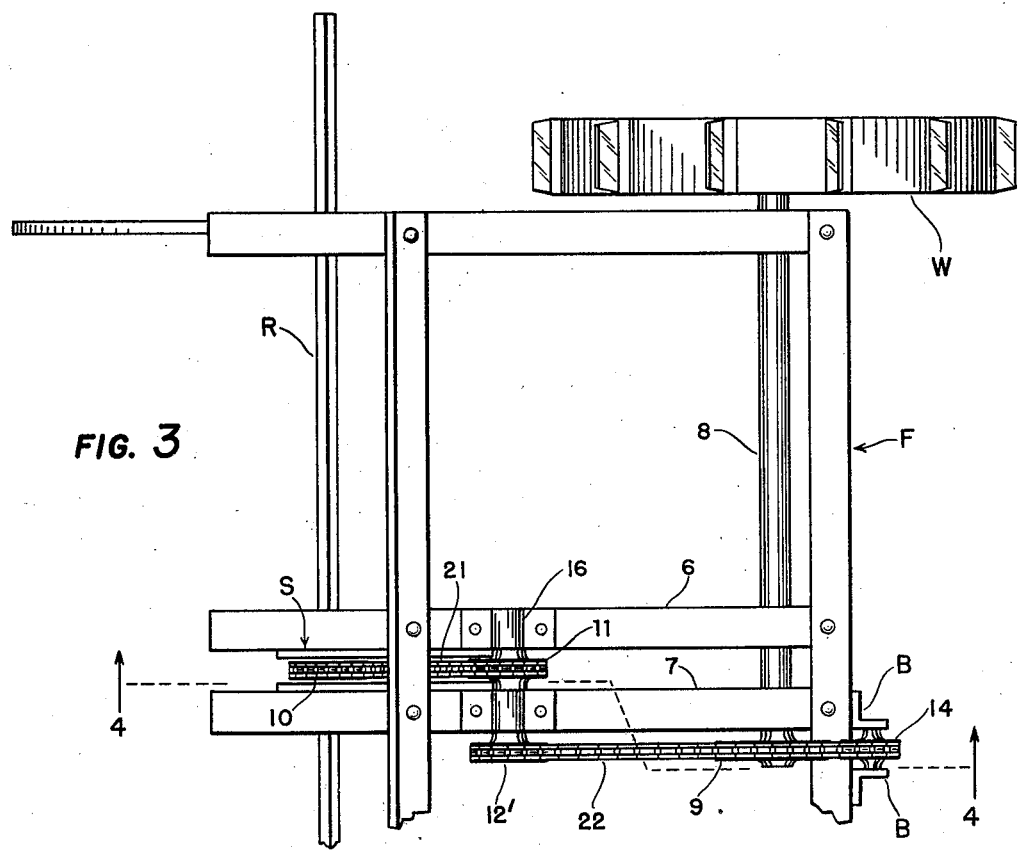
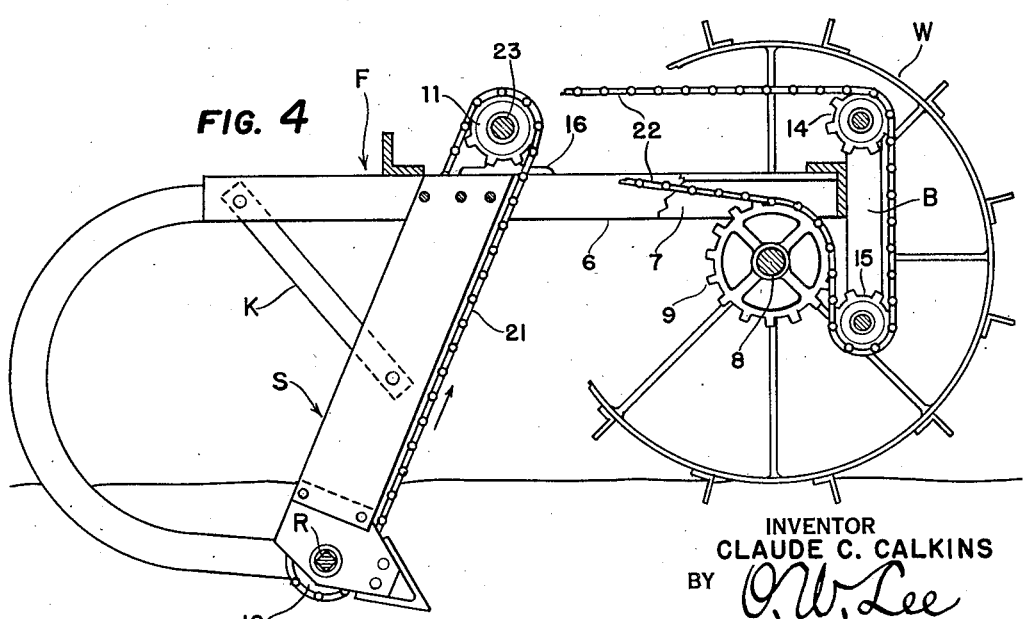
INVENTOR
CLAUDE C. CALKINS
BY O. W. Lee
ATTORNEY Patented May 9, 1950

2,506,577

UNITED STATES PATENT OFFICE 2,506,577

ROTARY ROD WEEDER

Claude C. Calkins, Spokane, Wash., assignor to Calkins Manufacturing Company, Spokane, Wash.

Application March 18, 1946, Serial No. 655,256

7 Claims. (Cl. 97—42)

The present invention relates to certain new and useful improvements in a rotary rod weeder of the center drive type, and is particularly directed to a structural arrangement wherein the sprocket drive chain is utilized to lift weeds, trash, and other refuse, upwardly and forwardly so that gravity causes this refuse to continually drop off instead of accumulating.

Center drive rod weeders have long been well known, and have the advantage that the drive does not occupy an appreciable portion of the width of the machine, as does the well known end drive. The end drive has always been the most widely used, because the center drive does not readily free itself from weeds, trash and other refuse, which collect ahead of the drive shoe or shield when these machines are used for trashy lump mulch tillage, which is now their most extensive utilization, they having long since outgrown their original purpose of mere weeding.

According to the conventional practice, the center drive sprocket chain is housed in a shoe or shield which extends downwardly and forwardly so as to position the rotary rod under the ground. Any roots, vines, weeds and stubble that bend around this shield, are likely to drag along for considerable distance, and divert the billowing clods to opposite sides of the shield so as to leave an objectionable trench.

According to the present invention, only the idle flight of the drive sprocket chain is housed in a shield and the working flight travels upwardly along the outer front edge of the shield, which in the present invention extends downwardly and rearwardly, in contradistinction to the conventional practice. This structure assures that any roots, vines, weeds and stubble, will be carried upwardly and forwardly by the working flight of the drive sprocket chain and will drop off by gravity instead of accumulating.

Fig. 1 is a fragmentary plan view showing a center drive rotary rod weeder made according to the present invention, using one continuous drive chain.

Fig. 2 is a vertical section taken along the line 2—2 of Fig. 1.

Fig. 3 is a plan view similar to Fig. 1 except that the drive is by two sections of sprocket chain, instead of one.

Fig. 4 is a vertical section taken along the line 4—4 of Fig. 3.

As shown in Fig. 1, the weeder comprises a frame F having a front rail 2 and a rear rail 3, connected together by end rails such as 4, and including two centrally located cross rails 6 and 7 which are spaced apart so as to receive the drive shield S therebetween.

The forward portion of this frame F is supported by wheels such as W, one of which turns the axle 8 and the drive sprocket 9 which is secured thereto. Each end rail 4 has an earth engaging standard such as 5 secured thereto, and the rotary rod R is suitably journaled on the lower ends of these standards and in the center drive shield S.

As will be seen from Fig. 2 this center drive shield S is bolted to the cross rails 6 and 7 and suitably braced as indicated at K. In contradistinction to the conventional practice, this shield S extends rearwardly downward, and this is of prime importance to the present invention. It should be noted that when the frame F is level, this shield S and the standards 5 reach considerably lower than the wheel W so that the rotary rod R is at tillage depth rather than at weeding depth.

A sprocket wheel 10 is suitably journaled in the lower end of the shield S, and the rotary rod R passes through a square bore in this sprocket wheel 10 so as to turn therewith.

A sprocket wheel 11 is journaled in bearing brackets such as 16 disposed above this center drive shield S; and an idler sprocket wheel 12 is suitably journaled forwardly of said drive shield S.

A sprocket chain 20 is trained over the sprocket 11 and extends downwardly inside the shield S, and passes around the lower sprocket 10, and then extends upwardly along the outside of the front of said shield to the idler sprocket 12 which engages the reverse side of this sprocket chain which then passes forward to any suitable drive mechanism. In the present instance the drive mechanism comprises the aforesaid drive sprocket 9 over which the sprocket chain 20 is trained in the conventional overshot manner, so as to afford a reverse drive, as is necessary in all rotary rod weeders. The return flight of this sprocket chain then passes around idler sprockets such as 15 and 14 which are journaled upon suitable brackets such as B—B attached to the front rail 2. The sprocket wheel 15 is disposed so as to enhance the wrap of the sprocket chain around the drive sprocket 9, and the idler sprocket 14 is disposed so as to position the return flight of the sprocket chain above the frame F. Either one of the idler sprockets 14 or 15 may be slidably mounted so as to serve as a take-up, in the well known conventional manner.

For convenience of illustration, the various leads of the sprocket chain 20 are shown in parallel relation to the oppositely traveling lead corresponding thereto, but in actual practice this parallel relation is usually not adhered to. In actual practice the bearing brackets 16 are usually made tall enough to raise the sprocket wheel 11 sufficiently to enable the idler sprocket wheel 12 to be placed above the frame instead of below as here shown.

The shield S may be of any suitable construction; as here shown, it comprises a pair of side plates 25—25 and a front wall 18. For convenience of assembly, a pair of bearing plates such as 26 are attached to the lower ends of these side plates 25—25, and a narrow plow point or shoe 27 is secured between the front ends of these bearing plates to facilitate penetration. A gap is left between this plow point 27 and the front edge of the shield S so as to provide a passage for the upward working flight of the sprocket chain 20 as it leaves the sprocket wheel 10. This construction enables the sprocket wheel 10, bearing plates 26 and plow point 27, to be assembled as a unit, and is of considerable advantage when these parts need to be replaced because of wear. The bottom of this shield S should be entirely open to accommodate escape of dirt, and the back of the shield may also be wide open.

The described structure is the preferred embodiment of the shield S, but it should be understood that the side plates 25—25 may be of sufficient length to supplant the described bearing plates 26, in which case the plow point 27 can also be omitted, the invention having been originally made in that form and satisfactorily operated.

As shown in Fig. 2, the sprockets 10 and 12 should be disposed so as to position the upward working flight of the sprocket chain 20 approximately parallel with the outer front edge of the shield S and in close proximity thereto. As here shown the front wall 18 of the shield S is cut away at 19 and a small cleaner sprocket 17 is rotatably mounted so that its teeth project through the opening 19 and engage the sprocket chain 20, so as to push out any small rocks that may lodge in the sprocket chain.

The invention can be operated in fields where there is tall stubble, large weeds and considerable underground vegetation, and as the shield S passes through the ground, any refuse must either drag off to one side or the other of this shield or else be carried upward and forwardly by the sprocket chain 20 until it either drops off by gravity or else is brushed off by standing stubble or weeds which have not yet been reached by the rotary rod and are consequently rooted in the ground and therefore more effective in brushing this constantly moving refuse off of the sprocket chain. It will be seen that the described inclination of the shield S enhances the efficiency of the sprocket chain in clearing away refuse, and it will also be noted that this described inclination effects a substantial saving in the amount of sprocket chain required, as contrasted with the usual practice where the shield is oppositely inclined and the sprocket chain must reach to the rear of the frame instead of only part way as here shown.

The foregoing description discloses one example of the physical embodiment of my invention and is not intended in a limiting sense. By reference to Fig. 2 it will be seen that this embodiment can be readily converted into a drive having two sections of sprocket chains instead of one as here illustrated. This transformation merely requires mounting the sprocket wheel 12 on the same shaft as the sprocket wheel 11 and then using two sprocket chains instead of one. This embodiment is shown in Fig. 3 and Fig. 4 where the previous reference numerals are used except that the sprocket wheel 12 in its new location is designated 12'.

As shown in Fig. 3, the sprocket wheels 11 and 12 are both mounted on the same shaft 23 which is best seen in Fig. 4 and which is journaled in bearing brackets 16 the same as previously described, and the location of the sprockets 10 and 11 are the same as previously described. Here the sprocket chain 21 is trained around the sprockets 10 and 11 only, and its working flight extends upwardly along the outside of the front of the shield S. A second sprocket chain 22 is trained around the sprocket 12' and then over the drive sprocket 9, then passed around the idler sprockets 15 and 14 and returned to the sprocket 12'. In this embodiment these idler sprockets 14 and 15 and the drive sprocket 9 are necessarily located to one side of the central cross bars 6 and 7, and in actual practice they are usually placed on the side nearest the drive wheel W instead of on the opposite side as here shown merely for convenience of illustration.

It will be readily realized that any other form of reverse drive may be employed, and the present showing is not intended in a limiting sense but only as an example.

It will be noted that in each instance the shield S affords a sturdy support for the lower sprocket wheel 10 and the rotary rod which passes therethrough, and this is essentially necessary for the heavy duty to which machines of this kind are now subjected for tillage purposes, as distinguished from mere weeding. It is also essentially necessary that the downwardly traveling flight of the sprocket chain be shielded so as to exclude weeds, stubble and other trash from this portion of the sprocket chain, which would otherwise pull any refuse down against the ground where it could not escape and would greatly interfere with satisfactory operation.

Rotary rod weeders are usually provided with castor wheels which serve as a depth gage and also for transport, but these well known expedients are not here shown, because various forms of tripod lift, or else power lift are also conventional practice, and are equally applicable to the present invention. Any form of tractor hitch may be employed and such well known expedients need not be here shown, it being widespread general practice to hitch several rotary rod weeders in a gang, for large scale farming.

I claim as my invention:

1. In a rotary rod weeder including a frame, a drive mechanism comprising a shield secured to said frame and extending downwardly and rearwardly therefrom, said shield embodying spaced apart side walls and a front edge wall, a sprocket wheel journaled in the lower end of said shield, a weeding rod extending through said sprocket wheel and turned thereby, a sprocket wheel rotatably mounted at the top of said shield, a sprocket chain trained around said sprockets and having its working flight extending upward along the outside of the front of said shield and its idle flight extending upwards inside said shield, and means to drive said sprocket chain upwardly along the front of said shield.

2. In a rotary rod weeder including a frame, a drive mechanism comprising a shield secured to said frame and extending downwardly and rearwardly therefrom, said shield embodying spaced apart side walls and a front edge wall, bearing plates secured to the lower end of said shield, a narrow plow point secured between said plates and disposed forwardly of the lower end of said shield, a sprocket wheel journaled between said plates, a weeding rod extending through said sprocket wheel and turned thereby, a sprocket wheel rotatably mounted at the top of said shield, a sprocket chain trained around said sprockets and having its working flight extending upward between said plow point and said shield and along the outside of the front of said shield, and means to drive said sprocket chain upwardly along the front of said shield.

3. In a rotary rod weeder including a frame, a drive mechanism comprising a shield secured to said frame and extending downwardly and rearwardly therefrom, said shield embodying spaced apart side walls and a front edge wall, a sprocket wheel journaled in the lower end of said shield, a weeding rod extending through said sprocket wheel and turned thereby, a sprocket wheel rotatably mounted at the top of said shield, a sprocket chain trained around said sprockets and having its working flight extending upward along the outside of the front of said shield, a sprocket wheel over which the reverse side of said working flight is trained, an idler sprocket journaled in said shield and engaging the working flight of said sprocket chain below the third said sprocket so as to clear out each link before it engages said third sprocket, one or more idler sprockets around which said sprocket chain is trained and returned to the foresaid sprocket wheel at the top of said shield, and means to drive said sprocket chain upwardly along the front of said shield.

4. In a rotary rod weeder including a frame, a drive mechanism comprising a shield secured to said frame and extending downwardly therefrom, said shield embodying spaced apart side walls and a front edge wall, a sprocket wheel journaled in the lower end of said shield, a weeding rod extending through said sprocket wheel and turned thereby, a sprocket wheel rotatably mounted at the top of said shield, a sprocket chain trained around said sprockets and having its working flight extending upward along the outside of the front of said shield, and its idle flight extending upwards inside said shield, and means to drive said sprocket chain upwardly along the front of said shield.

5. In a rotary rod weeder including a frame, a drive mechanism comprising a member rigidly secured to said frame and extending downwardly and rearwardly therefrom, a sprocket wheel journaled in the lower end of said member, a weeding rod extending through said sprocket wheel and turned thereby, a sprocket wheel rotatably mounted at the top of said member, a sprocket chain trained around said sprocket wheels and having its working flight extending upwardly in exposed relation along the front of said member, and means to drive said sprocket chain upwardly along the front of said member.

6. In a rotary rod weeder including a frame, a drive mechanism comprising a shield secured to said frame and extending downwardly and rearwardly therefrom, said shield embodying spaced apart side walls and a front edge wall, a sprocket wheel journaled in the lower end of said shield, a weeding rod extending through said sprocket wheel and turned thereby, a sprocket wheel rotatably mounted at the top of said shield, a sprocket chain trained around said sprockets and having its working flight extending upward along the outside of the front of said shield, a sprocket wheel over which the reverse side of said working flight is trained, a drive sprocket over which said reverse side of the working flight is also trained, one or more idler sprockets around which said sprocket chain is trained and returned to the aforesaid sprocket wheel at the top of said shield.

7. In a rotary rod weeder including a frame, a drive mechanism comprising a shield secured to said frame and extending downwardly and rearwardly therefrom, said shield embodying spaced apart side walls and a front edge wall, a sprocket wheel having hubs journaled in the lower end of said shield, a weeding rod extending through said sprocket wheel and turned thereby, a sprocket wheel rotatably mounted at the top of said shield, a sprocket chain trained around said sprockets and having its working flight extending upward along the outside of the front of said shield, a sprocket wheel over which the reverse side of said working flight is trained, one or more idler sprockets around which said sprocket chain is trained and returned to the aforesaid sprocket wheel at the top of said shield, and means to drive said sprocket chain upwardly along the front of said shield.

CLAUDE C. CALKINS.

REFERENCES CITED

The following references are of record in the file of this patent:

UNITED STATES PATENTS

| Number | Name | Date |
|---|---|---|
| 1,046,271 | Colwell | Dec. 3, 1912 |
| 1,384,631 | Parschauer | July 12, 1921 |
| 2,355,229 | Miller | Aug. 8, 1944 |
| 2,379,781 | Blaydes | July 3, 1945 |